(12) United States Patent
Johnson et al.

(10) Patent No.: US 6,252,638 B1
(45) Date of Patent: Jun. 26, 2001

(54) COLOR CONTROLLABLE ILLUMINATION DEVICE, INDICATOR LIGHTS, TRANSMISSIVE WINDOWS AND COLOR FILTERS EMPLOYING RETARDER STACKS

(75) Inventors: Kristina M. Johnson, Longmont; Gary D. Sharp, Boulder, both of CO (US)

(73) Assignee: ColorLink, Inc., Boulder, CO (US)

( * ) Notice: Subject to any disclaimer, the term of this patent is extended or adjusted under 35 U.S.C. 154(b) by 0 days.

(21) Appl. No.: 09/190,273

(22) Filed: Nov. 13, 1998

Related U.S. Application Data

(63) Continuation-in-part of application No. 09/126,330, filed on Jul. 31, 1998, which is a continuation-in-part of application No. 08/853,468, filed on May 9, 1997, now Pat. No. 5,990,996, and a continuation-in-part of application No. 08/855,716, filed on May 8, 1997, now Pat. No. 5,953,083, and a continuation-in-part of application No. 08/661,498, filed on Jun. 11, 1996, now Pat. No. 6,091,462, and a continuation-in-part of application No. 08/645,580, filed on May 14, 1996, now Pat. No. 5,822,021, which is a continuation-in-part of application No. 08/522,215, filed on Aug. 31, 1995, now Pat. No. 5,825,849, which is a continuation of application No. 08/447,522, filed on May 23, 1995, now Pat. No. 5,751,384.

(51) Int. Cl.⁷ .................................................. G02F 1/13
(52) U.S. Cl. ................... 349/5; 362/293; 362/61
(58) Field of Search .............................. 349/1, 5, 6, 119, 349/18, 61; 362/293; 353/30, 84

(56) References Cited

U.S. PATENT DOCUMENTS

| | | | |
|---|---|---|---|
| 2,493,200 | 1/1950 | Land | 88/112 |
| 2,638,816 | 5/1953 | Stolzer | 88/61 |
| 4,003,081 | 1/1977 | Hilsum et al. | 358/64 |
| 4,019,808 | 4/1977 | Scheffer | 350/160 LC |

(List continued on next page.)

FOREIGN PATENT DOCUMENTS

| | | | |
|---|---|---|---|
| 4029838 | 3/1991 | (DE) | 349/97 |
| 0121379 | 5/1988 | (JP) | |
| 4022920 | 1/1992 | (JP) | |
| WO95/26110 | 9/1995 | (WO) | |

OTHER PUBLICATIONS

U.S. application No. 07/967,218, Sharp et al., filed Oct. 27, 1992.

Scheffer, T.J., "New multicolor liquid crystal displays that use a twisted nematic electro–optical cell," J., Appl. Phys. (1973) 44(11):4799–4803.

Carlsen, W.J. and Buhrer, C.F., "Flat Passband Birefringent Wavelength–Division Multiplexers," Electronics Letters (1987) 23(3):106–107.

Wright, H., et al., "Active filters enable color imaging," Laser Focus World (May 1996) 85–90.

Cambridge Research & Instrumentation, Inc., "Liquid Crystal Tunable Filter," Cambridge, MA, 2 pages.

Displaytech, Inc. (Jan., 1996), "Switchable Color Filter", Boulder, CO, 4 pages.

(List continued on next page.)

Primary Examiner—Kenneth Parker
(74) Attorney, Agent, or Firm—Fleshner & Kim, LLP

(57) ABSTRACT

A color filter device for controlling the color of light output by an illumination device or for controlling the color of light passing through a window includes at least a retarder and a polarization analyzer. The device may also include an input polarizer. The device may further include an electrically controllable modulator and an output retarder for selectively controlling the spectrum of light output by the device. A color filter device embodying the invention enables rapid and effective control over the spectrum and amplitude of light passing through the filter to achieve desired effects. A device embodying the invention could be an indicator light, an illumination device, a diagnostic testing device, a transmissive window, or any other type of device where rapid and effective control of a spectrum of light is desired.

21 Claims, 11 Drawing Sheets

U.S. PATENT DOCUMENTS

| | | |
|---|---|---|
| 4,025,164 | 5/1977 | Doriguzzi et al. ............. 350/160 LC |
| 4,232,948 | 11/1980 | Shanks ................................ 350/347 |
| 4,294,524 * | 10/1981 | Stolov .................................... 353/84 |
| 4,367,924 | 1/1983 | Clark et al. .......................... 350/334 |
| 4,416,514 | 11/1983 | Plummer . |
| 4,448,823 | 5/1984 | Clifford .................................... 428/1 |
| 4,497,543 | 2/1985 | Aoki et al. ........................... 350/337 |
| 4,575,193 | 3/1986 | Greivenkamp, Jr. ................. 350/401 |
| 4,582,396 | 4/1986 | Bos et al. ............................. 350/347 |
| 4,620,791 * | 11/1986 | Combastet ............................... 349/5 |
| 4,635,051 | 1/1987 | Bos et al. ............................. 340/757 |
| 4,652,087 | 3/1987 | Bos et al. ............................. 350/332 |
| 4,758,818 | 7/1988 | Vatne ................................... 340/701 |
| 4,759,612 | 7/1988 | Nakatsuka et al. .................. 350/337 |
| 4,770,500 | 9/1988 | Kalmanash et al. ............. 350/347 E |
| 4,770,525 | 9/1988 | Umeda et al. ........................ 353/122 |
| 4,786,146 | 11/1988 | Ledebuhr ........................ 350/33 IR |
| 4,786,964 | 11/1988 | Plummer . |
| 4,796,978 | 1/1989 | Tanaka et al. ........................ 350/337 |
| 4,808,501 | 2/1989 | Chiulli . |
| 4,832,461 * | 5/1989 | Yamagishi et al. ....................... 349/6 |
| 4,834,508 | 5/1989 | Fergason ........................... 350/339 F |
| 4,867,536 | 9/1989 | Pidsosny et al. .................... 350/337 |
| 4,917,464 | 4/1990 | Conner ................................. 350/335 |
| 4,917,465 | 4/1990 | Conner et al. ....................... 350/335 |
| 4,966,441 | 10/1990 | Conner ................................. 350/335 |
| 4,995,702 | 2/1991 | Aruga . |
| 5,032,007 | 7/1991 | Silverstein et al. .................. 350/335 |
| 5,033,825 | 7/1991 | Ishikawa et al. ..................... 350/339 |
| 5,050,965 | 9/1991 | Conner et al. ......................... 359/53 |
| 5,122,887 | 6/1992 | Mathewson ........................... 349/97 |
| 5,124,818 | 6/1992 | Conner .................................. 359/53 |
| 5,126,864 | 6/1992 | Akiyama et al. ..................... 350/337 |
| 5,132,826 | 7/1992 | Johnson et al. . |
| 5,157,523 * | 10/1992 | Yamagishi ........................... 349/119 |
| 5,179,459 | 1/1993 | Plesinger ............................... 359/74 |
| 5,194,975 * | 3/1993 | Akatsuka et al. ................... 349/119 |
| 5,220,447 | 6/1993 | Yokokura et al. ..................... 359/93 |
| 5,231,432 | 7/1993 | Glenn . |
| 5,237,435 | 8/1993 | Kurematsu et al. .................... 359/41 |
| 5,243,455 | 9/1993 | Johnson et al. ........................ 359/93 |
| 5,276,436 | 1/1994 | Shaw et al. . |
| 5,282,121 * | 1/1994 | Bornhorst et al. ................... 362/294 |
| 5,299,039 | 3/1994 | Bohannon .............................. 359/53 |
| 5,321,450 | 6/1994 | Shapiro et al. . |
| 5,337,103 | 8/1994 | Gulick . |
| 5,337,174 | 8/1994 | Wada et al. ............................ 359/73 |
| 5,347,378 | 9/1994 | Handschy et al. ..................... 359/53 |
| 5,353,075 | 10/1994 | Connor et al. . |
| 5,355,188 | 10/1994 | Biles et al. . |
| 5,369,513 | 11/1994 | Akatsuka et al. ...................... 359/73 |
| 5,381,253 | 1/1995 | Sharp et al. . |
| 5,400,095 | 3/1995 | Minich et al. . |
| 5,422,756 | 6/1995 | Weber ................................... 359/487 |
| 5,469,279 | 11/1995 | Sharp et al. ............................ 359/53 |
| 5,500,523 | 3/1996 | Hamanaka ........................... 250/216 |
| 5,510,861 | 4/1996 | Minich . |
| 5,528,393 | 6/1996 | Sharp et al. ............................ 359/53 |
| 5,574,580 | 11/1996 | Ansley ................................... 359/41 |
| 5,585,950 | 12/1996 | Nishino et al. ...................... 349/118 |
| 5,608,551 | 3/1997 | Biles et al. ............................. 359/95 |
| 5,658,490 | 8/1997 | Sharp et al. ..................... 252/299.01 |
| 5,686,931 | 11/1997 | Fünfschilling et al. ............... 345/88 |
| 5,739,881 | 4/1998 | Xu et al. .............................. 349/118 |
| 5,777,709 | 7/1998 | Xu et al. .............................. 349/120 |
| 5,798,807 * | 8/1998 | Prehn ..................................... 349/76 |
| 5,829,868 * | 11/1998 | Hutton ................................. 362/276 |

OTHER PUBLICATIONS

Title, A.M. and Rosenberg, W.J., "Tunable birefringent filters," Opt. Eng., (1981) 20(6):815–823.

Solc, Ican, "Birefringent Chain Filters," J. Opt, Soc. Am. (1965) 55(6):621–625.

Wu, Shin–Tson, "Birefringence dispersions of liquid crystals," Physical Review A, (1986) 33(2):1270–1274.

Harris, S.E., et al., "Optical Network Synthesis Using Birefringent Crystals, I. Synthesis of Lossless Networks of Equal–Length Crystal," J. Opt. Soc. America (1964) 54(10):1267–1279.

Amman, E.O., "Optical Network Synthesis Using Birefringent Crystals, III., Some General Properties of Lossless Birefringent Networks," J. Opt. Soc America (1966) 56(7):943–951.

Amman, E.O. and Yarborough, J.M., "Optical Network Synthesis Using Birefringent Crystals V. Synthesis of Lossless Networks Containing Equal–Length Crystals and Compensators," J. Opt. Soc America (1966) 56(12): 1746–1754.

Sharp, G.D., et al., "P–60: Color Switching Using Ferroelectric Liquid Crystals," Society for Information Display, International Symposium, Digest of Technical Papers, Vo., XXIV, Seattle, Washington, May 18–20, 1993.

Kondo, et al., "Ferroelectric Liquid Crystal Materials Applied to Guest–Host Type Displays," Ferroelectrics (1988) 85:361–373.

Billings, BH., "A Tunable Narrow–Band Optical Filter," J., Opt. Soc. America (1947) 37:738–746.

Buhrer, Carl F., "Synthesis and tuning of high–order birefringent filters," Applied Optics (Apr. 20, 1994) 33(12): 2249–2254.

Y. Wang; "Surface Plasmon Tunable Color Filter and Display Device;" Society for Information Display International Symposium Digest of Technical Papers; vol. 28, pp. 63–66, May 1997.

F.H. Yu and H.S. Kwok; "A New Driving Scheme for Reflective Bistable Cholesteric LCDs;" 1997 Society for Information Display International Symposium Digest of Technical Papers; p. 659, May, 1997.

Y. Nakai; "A Reflective Tri–Layer Guest–Host Color TFT–LCD;" 1997 Society for Information Display International Symposium Digest of Technical Papers; p. 83, May, 1997.

* cited by examiner

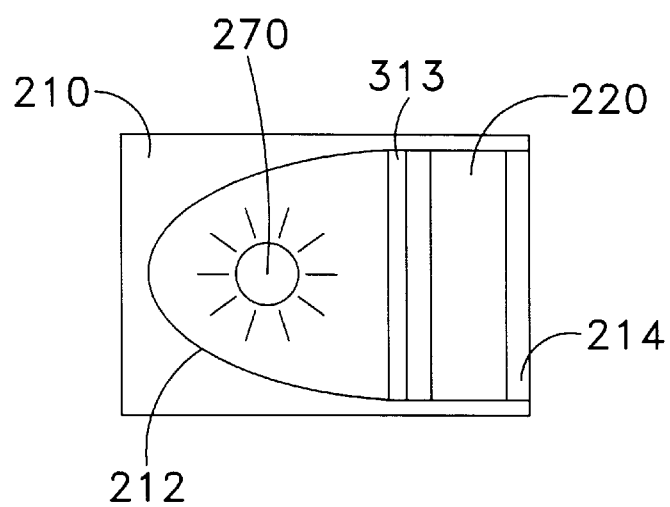
FIG. 13
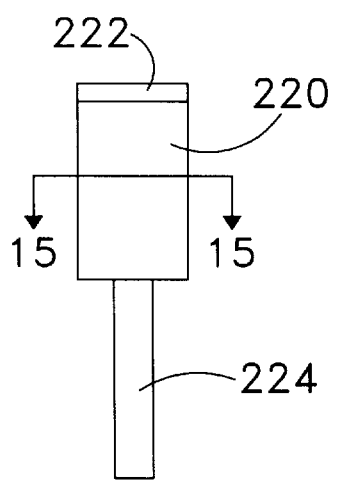
FIG. 14
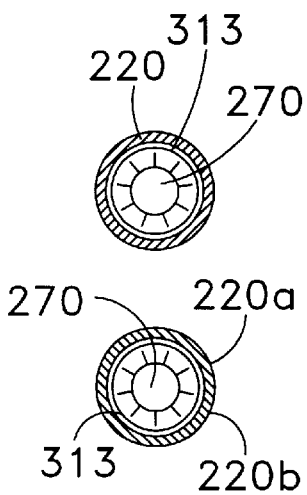

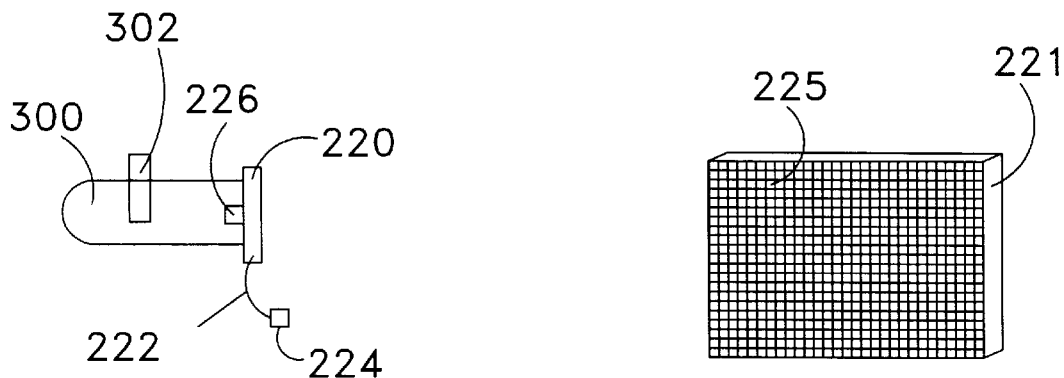
FIG. 16
FIG. 17B
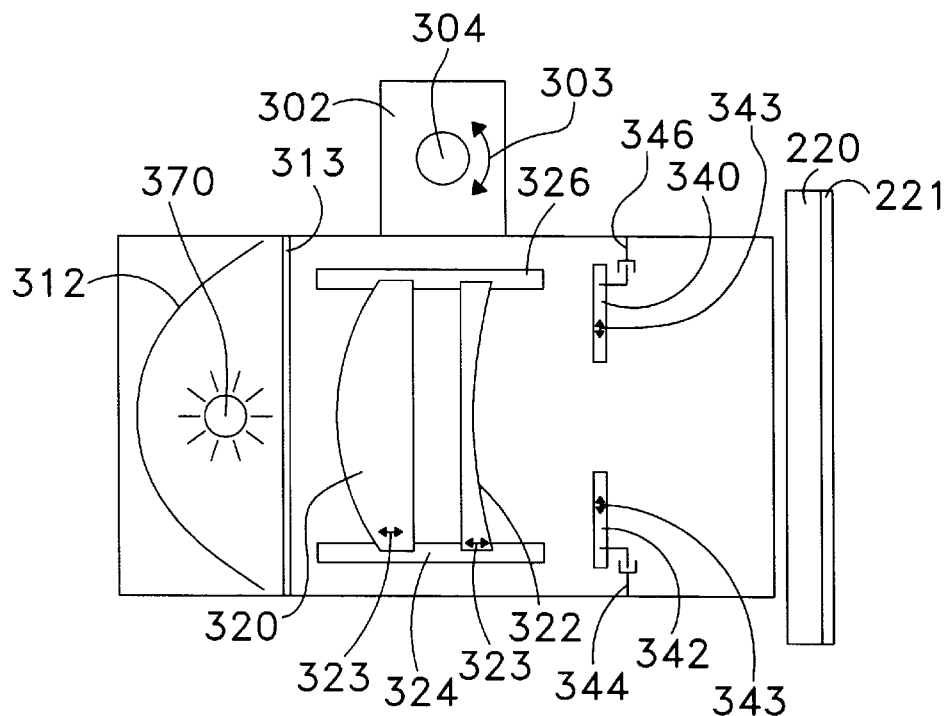
FIG. 17A

COLOR CONTROLLABLE ILLUMINATION DEVICE, INDICATOR LIGHTS, TRANSMISSIVE WINDOWS AND COLOR FILTERS EMPLOYING RETARDER STACKS

This application is a continuation-in-part of U.S. patent application Ser. No. 09/126,330, filed Jul. 31, 1998, which is a continuation-in-part of application Ser. No. 08/853,468, filed May 9, 1997 now U.S. Pat. No. 5,990,996, and a continuation-in-part of application Ser. No. 08/645,580, filed May 14, 1996, now U.S. Pat. No. 5,822,021. This application is also a continuation-in-part of application Ser. No. 08/855,716, filed on May 8, 1997 now U.S. Pat. No. 5,593,083, which is a continuation of application Ser. No. 08/447,522, filed on May 23, 1995, which is now issued as U.S. Pat. No. 5,751,384. This application is also a continuation in part of application Ser. No. 08/661,498, filed Jun. 11, 1996, now U.S. Pat. No. 6,091,462, which is a continuation in part of application Ser. No. 08/522,215, filed Aug. 31, 1995, now issued as U.S. Pat. No. 5,825,849.

BACKGROUND OF THE INVENTION

1. Field of the Invention

The invention is related to color filters which can be used in association with illumination devices such as stage and entertainment lighting, indoor and outdoor lights, indicator lights, transmissive windows and other devices.

2. Background of the Related Art

Existing interior and exterior lighting devices for home and commercial applications usually output nearly white light from an incandescent, fluorescent, halogen or tungsten light source. Such lights can include lamps, spotlights and flood lights.

Colored lighting devices are mainly used only for theater, concert, film making or television applications. The most common types of colored lighting devices include one or more pieces of dyed gels that are placed over a white light source to obtain a colored beam of light. For example, a green colored gel absorbs the blue and red components of white light so that only green light is transmitted. A typical movie set may use thousands of dyed gels for producing colored light. Each gel must by manually placed over each light, and the gels must be manually changed when the movie producer calls for a different color for setting a different mood.

Although most colored lighting devices are designed to produce only a single color of light, some newer stage lighting devices have been designed to produce multiple different colors on command. For instance, companies such as Wybron (located in Colorado Springs, Colo.) started marketing lighting products such as the Coloram II and the Scroller. These devices include different colored gels that are attached to a rotatable roller located in the path of a white light source. The roller is rotated in response to an electrical signal to place selected colored gels in the white light path to provide selected output colors. Unfortunately, these devices have several drawbacks. The mechanical system used to rotate the rollers is subject to breakdowns, and the movement of the gels can cause the gels to rip or tear. Also, the colors are unsaturated, and the gels tend to bleach out after long exposure to the high power white light sources used in these devices. Also, the rotating roller devices are only capable of producing a limited number of different colors (32 for the Coloram II) because only a limited number of gels are available for positioning in the light path. Furthermore, it takes a significant amount of time to switch between colors.

One improvement on the rotating roller gel-based devices described above is the Varilite VL2C™, which incorporates a dichroic color changing system known under the tradename DICHRO*WHEEL™. This device uses vacuum deposited thin film layers of dichroic materials that selectively reflect part of the visible spectrum while passing other parts of the spectrum with high efficiency and a high degree of color purity. As a result, the light output by this device is more color saturated. The VL2C™ also allows up to nine different fixed images to be projected by the lighting system, through the use of laser etched patterns in the dichroic coatings.

While the Varilite devices can produce better saturated colored light than the rotating roller devices, and they can produce a larger number of different colors (120 for the VL2C™), these devices also rely on a mechanical switching mechanism that is prone to mechanical breakdown. The dichroic filters are attached to a wheel that can be rotated to place different color filters in the path of a light source. These devices are also relatively expensive because of the vacuum deposition process used to produce the dichroic filters. Also, due to the mechanical switching, these devices are slow in switching between colors. Furthermore, the dichroic filters have a narrow field of view, and the filters require forced air cooling to prevent catastrophic failure of the substrates upon which the filters are based. Also, the dichroic filters are generally binary, meaning they will project one part of the spectrum, or another. Accordingly, it is difficult to generate many different shades of colors with these filters.

These are also some stage lighting devices that include multiple different colored light sources, and lights that include multiple single color light sources and a corresponding plurality of color filters so that the device can produce different colors of light.

Current colored indicator lights and indicator light arrays which are used in conjunction with vehicles, appliances and various electronic equipment can be broadly classified into two basic types. The first type are light emitting diodes (LEDs) which emit colored light when activated with electricity. The second type utilize a light source such as a lightbulb in association with a color filter to generate a beam of colored light.

Most existing colored indicator lights are configured to output only a single color of light. If it is desirable for an indicator light to change its output color, typically multiple different colored light sources must be provided to generate the different colors of light, or some mechanical switching mechanism must be used to switch from a first colored filter to a second colored filter. Thus, a single indicator light capable of selectively outputting different colors is complex and expensive.

SUMMARY OF THE INVENTION

It is an object of the present invention to provide lighting devices, indicator lights, and transmissive windows with a non-moving color filter that can rapidly switch between different colors in response to an electronic signal.

It is also an object of the present invention to provide an improved color filter material that can be used in place of dyed gels or vacuum deposited dichroic coatings which is less expensive, has better color characteristics and that is better able to withstand a high temperature environment.

It is also an object of the present invention to provide an illumination device, such as a floodlight or spotlight for theatrical stage lighting, or for interior or exterior lighting, which is capable of switching between thousands, or even millions of different colors of illumination light within milliseconds.

It is also an object of the present invention to provide an illumination device that can rapidly switch between different colors of light using a color filter that is lightweight and that is less expensive, less mechanically complex, and more reliable than current colored illumination devices.

It is a further object of the present invention to provide a color filter which can be used in conjunction with a transmissive window to selectively vary the spectrum of light transmitted through the window.

It is a further object of the present invention to provide a color filter which can be used in connection with medical and other testing and diagnostic equipment to switch between specific light spectrums in a rapid, inexpensive and efficient manner.

It is a further object of the present invention to provide a color filter for an indicator light or an illumination device that can switch between different color spectrums more rapidly than existing color filter devices.

It is a further object of the present invention to provide a color filter for use with an illumination device that can withstand the relatively high temperatures associated with high power light sources using only a passive IR radiation filter as a thermal shield.

It is a further object of the present invention to provide a colored lighting device having an electronically switchable modulator that enables the device to project colored text and/or images that are dynamically changeable.

The invention is a lighting device, an indicator light, a transmissive window, or a color filter for use in association with such devices. In its simplest form, a color filter embodying the invention may include only an input polarizer, a retarder and an output polarization analyzer. If a polarized source of light is used with the filter, the input polarizer can be eliminated so that the color filter includes only a retarder and an output polarization analyzer. These simple color filter devices would enable a lighting device to output a single color of light.

A color filter embodying the invention may further include an electrically switched modulator and an output retarder, which would enable the color filter to selectively vary the color of output light in response to an electronic signal. This type of color filter could switch between two colors of light. Such a color filter could also selectively vary the amount or intensity of a particular color of light in an analog fashion using an electronic signal applied to the modulator. Thus, for instance, a color filter embodying the invention could selectively vary an intensity of only a primary color (either additive or subtractive) of a light beam that includes all colors.

A single color filter stage that includes an input retarder, a modulator and an output retarder can be used in a color filter embodying the invention to control a first spectrum of light. Multiple color filter stages could also be combined in series within a color filter embodying the invention to yield independent control of multiple selected portions of the entire spectrum of white light. Thus, the color filter would be capable of switching an output light beam between multiple different colors by selectively energizing the modulators in each color filter stage. A color filter embodying the invention could be configured to produce multiple different shades of multiple primary colors. Such a color filter would be capable of producing millions of different colors of output light.

A color filter embodying the invention and including multiple color filter stages could utilize only a single input polarizer and a single output polarization analyzer, or separate input polarizers and output polarization analyzers could be provided for each color filter stage.

Other embodiments of the invention may include switchable cholesteric liquid crystals and/or cholesteric liquid crystal polymeric materials. Still other embodiments may include dye-based polarizers, guest-host liquid crystal devices, electrochromic, PLZT and/or other electro-optic and magneto-optic materials.

Simple color filters embodying the invention that are designed to output only a single color of light have several advantages over the existing dyed gels and vacuum deposited dichroic thin films. First, the color saturation of color filters embodying the invention are generally much better than these prior art devices. Color filters embodying the invention are also better able to withstand the high temperatures associated with high intensity stage lighting devices. Also, color filters embodying the invention are less expensive and easier to manufacture than the vacuum deposited thin films of dichroic material. Color filters embodying the invention also have a much greater field of view than the thin film dichroic materials.

A multistage switchable color filter embodying the invention is also superior to existing lighting devices configured to output multiple colors of light. First, color filters embodying the present invention are electrically switchable and have no moving parts that might break. Also, color filters embodying the invention can switch from one color to another in a far shorter period of time than existing mechanically switched systems. Color filters embodying the invention can switch from one color to another in less than 100 microseconds. Also, a multistage color filter embodying the invention can be configured to switch between millions of different colors in response to a color switching signal, as compared to the 32 or 120 colors available with mechanically switched color filters. Multistage color filters embodying the invention are also better capable of withstanding high temperatures than the prior art devices.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

A detailed description of preferred embodiments of the invention will be described in conjunction with the following drawing figures, wherein like reference numerals refer to like elements, and wherein:

FIG. 13 is a diagram of an illumination device embodying the invention;

FIG. 14 is an elevation view of another indicator light embodying the invention;

FIGS. 15A and 15B are sectional views of the illumination device shown in FIG. 14 taken along section line 15—15;

FIG. 16 is a side view of a spotlight embodying the invention;

FIG. 17A is a more detailed diagram of a spotlight embodying the invention;

FIG. 17B is a perspective view of a pixelated device that can be used in a device embodying the invention;

DETAILED DESCRIPTION OF PREFERRED EMBODIMENTS

Figure 1:
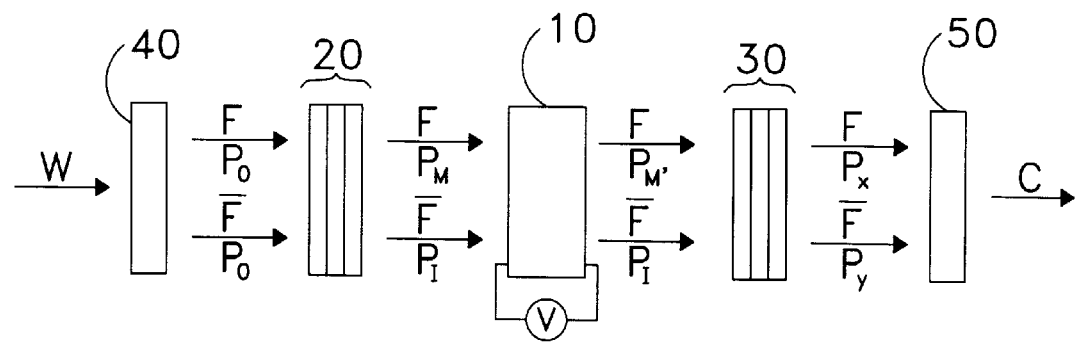
FIG. 1 is a diagram of a single stage color filter embodying the invention.

A device embodying the invention can utilize any type of non-moving electrically controllable color filter. Examples of color filter or color switching devices that can be used in a device embodying the invention are disclosed in the following references:

U.S. Pat. No. 5,619,355 to Sharp et al., which describes a liquid crystal handedness switch and color filter;

U.S. Pat. No. 5,528,393 to Sharp et al., which describes a split element liquid crystal tunable optical filter;

U.S. Pat. Nos. 5,686,931; 5,319,478; 5,295,009; and 5,235,443, which describe cholesteric polymers and color filters;

U.S. Pat. No. 4,582,396 to Bos et al., which discloses a field sequential color display system which includes an optical retarder and pleochroic filters;

U.S. Pat. No. 5,689,317 to Miller, which discloses tunable color filters;

U.S. Pat. No. 5,347,378 to Handschy et al, which discloses ferroelectric liquid crystal color-selective filters;

U.S. Pat. No. 3,967,881 to Moriyama et al., which discloses a liquid crystal display;

A publication by Y. Wang, entitled "Surface Plasmon Tunable Color Filter and Display Device," published in *Society for Information Display International Symposium Digest of Technical Papers*, vol. 28, pp. 63–66;

A publication by F. H. Yu and H. S. Kwok, entitled "A New Driving Scheme for Reflective Bistable Cholesteric LCDs," published in 1997 *Society for Information Display International Symposium Digest of Technical Papers*, page 659, May, 1997;

A publication by Y. Yang, entitled "Surface Plasmon Tunable Color Filter and Display Device," published in 1997 *Society for Information Display International Symposium Digest of Technical Papers*, page 63, May, 1997; and A publication by Y. Nakai, entitled "A Reflective Tri-Layer Guest-Host Color TFT-LCD," published in 1997 *Society for Information Display International Symposium Digest of Technical Papers*, page 83, May, 1997.

The disclosures of all the above-identified references are hereby incorporated by reference.

Detailed descriptions of still other color filters and combinations of color filter stages which can be utilized in devices embodying the invention can be found in U.S. Pat. application Ser. No. 09/126,330, filed Jul. 31, 1998, application Ser. No. 08/853,468, filed May 9, 1997, application Ser. No. 08/645,580, filed May 14, 1996, application Ser. No. 08/855,716, filed May 8, 1997, application Ser. No. 08/447,522, filed May 23, 1995, which is now issued as U.S. Pat. No. 5,751,384, application Ser. No. 08/661,498, filed Jun. 11, 1996, and application Ser. No. 522,215, filed May 11, 1990, which is now issued as U.S. Pat. No. 5,528,393. The disclosures of all of these applications and U.S. Pat. Nos. 5,751,384 and 5,528,393 are hereby incorporated by reference. For purposes of the present application, a brief description of some of the color filter stages disclosed in the applications and patents listed immediately above, and how those color filter stages can be combined in a single color filter, is provided below.

FIG. 1 shows the basic elements of a single stage color filter. The filter includes an input polarizer 40, an input retarder stack 20, a modulator 10, an output retarder stack 30, and an output polarizer 50 which acts as an analyzer.

As shown in FIG. 1, incident white light W can be considered to be the combination of light with the spectrum F and light with another spectrum $\overline{F}$. After the incident white light W passes through the input polarizer 40, it includes two portions having the spectrums F and $\overline{F}$, each of which has a polarization $P_0$.

The input retarder stack 20, which will be described in more detail below, transforms the polarization state of light in the spectrum F into a modulation state of polarization $P_M$. The input polarizer 20 also transforms light in spectrum $\overline{F}$ into an isotropic state of polarization $P_I$. The modulation state of polarization and the isotropic state of polarization refer to states of polarization which may or may not be operated upon by the modulator 10.

The modulator 10 is a device that selectively alters the polarization orientation of transmitted light in the modulation state of polarization based on an applied voltage. The modulator will change the polarization orientation of light having the modulation state by varying amounts, depending upon the voltage applied to the modulator. The modulator may or may not act upon light having the isotropic state of polarization, but the amount of any change in the polarization orientation of light having the isotropic state is independent of the voltage applied to the modulator. For some modulator designs, light having the isotropic state of polarization will pass through the modulator with its polarization orientation unchanged. In other modulator designs, light having the isotropic state of polarization will always undergo the same polarization orientation change, such as a 90° rotation, regardless of a voltage applied to the modulator 10.

In the example shown in FIG. 1, the modulator 10 passes light in the spectrum $\bar{F}$ with its polarization state unchanged. Thus, regardless of the voltage applied to the modulator 10, light in the spectrum $\bar{F}$ will exit the modulator 10 in the same polarization state that it entered, which in this case is the isotropic state of polarization $P_I$. Light in the spectrum F, having the modulation state of polarization $P_M$ will have its polarization state selectively altered depending upon the voltage applied to the modulator 10. Thus, light in the spectrum F will exit the modulator 10 with a polarization state $P_M'$.

The output retarder stack 30 is typically designed to undo the transformation caused by the input retarder stack 20. Thus, if the light having the spectrum $\bar{F}$ passes through the modulator 10 without any change to its polarization state, when light in the spectrum $\bar{F}$ passes through the output retarder stack 30, the transformation done by the input retarder stack 20 will be reversed and light in the spectrum $\bar{F}$ will exit the output retarder stack 30 with the original polarization state $P_0$. For purposes of discussion, we will call the polarization state of light in the spectrum $\bar{F}$ as $P_y$.

If the modulator 10 does not alter the polarization state of light in the spectrum F, the light in spectrum F entering the output retarder stack 30 will have the polarization state $P_M$. Because the output retarder stack 30 reverses the effect of the input retarder stack 20, light in the spectrum F will exit the output retarder stack 30 with the polarization state $P_o$. If the modulator 10 alters the polarization state of light having the spectrum F, the output retarder stack 30 will further change the polarization state of the modulated light in the spectrum F so that it exits the output retarder stack with a polarization state other than the original polarization state $P_0$. For purposes of discussion, we will call the polarization state of modulated light in the spectrum F exiting the output retarder stack the polarization state "$P_y$". The orientation of the polarization state $P_x$ will depend upon the amount that the polarization orientation of light in the spectrum F was altered when it passed through the modulator 10, which in turn depends upon the voltage applied to the modulator 10.

Light in the spectrums F and $\bar{F}$ will then encounter the output polarizer 50, which acts as an analyzer. The polarization orientation of the output polarizer 50 is selected so that light in the spectrums F and $\bar{F}$ will either be passed or blocked by the output polarizer 50. For instance, the output polarizer 50 could be oriented so that light having a polarization orientation $P_y$ is passed through the polarizer unchanged. This would result in all light in the spectrum $\bar{F}$ passing completely through the entire color filter without attenuation.

The design of the input retarder stack 20, output retarder stack 30, and the modulator 10 can be such that application of a voltage to the modulator 10 varies the polarization state of light in the spectrum F between the polarization state $P_y$ and an orthogonal polarization state $P_x$. In this instance, when the modulator 10 is activated so that light having the spectrum F exists the output retarder stack with the polarization state $P_y$, the light in spectrum F will have the proper polarization orientation to pass through the output polarizer 50 without attenuation. When the modulator is in a state that causes light in the spectrum F to have the orthogonal polarization state $P_x$, all light in the spectrum F would be blocked by the output polarizer. When intermediate voltages are applied to the modulator 10, a portion of the light in the spectrum F will be passed by the output polarizer 50 and a portion of the light in the spectrum F will be blocked by the output polarizer 50. Thus, by varying the voltage applied to the modulator 10, the color filter can alter the amount of light in the spectrum F which is allowed to pass completely through the color filter.

The output polarizer 50 could also be oriented so that light having a polarization orientation $P_y$ is blocked by the output polarizer 50 while light having the polarization orientation $P_x$, is passed by the output polarizer 50. In this instance, all light in the spectrum $\bar{F}$ would be blocked by the output polarizer. Application of a voltage to the modulator 10 would vary the polarization orientation of light in the spectrum F between the polarization state $P_x$ and the polarization state $P_y$. Thus, when the modulator 10 causes light in the spectrum F to exit the output retarder stack with the polarization orientation $P_x$, all light in spectrum F would exit the filter. When the modulator causes light in the spectrum F to have the polarization orientation $P_y$ when exiting the output retarder stack, all light in the spectrum F would also be blocked by the output analyzer, and no light would pass through the filter. When intermediate voltages are applied to the modulator 10, only a portion of the light in the spectrum F would pass through the output polarizer 50.

Figure 7:
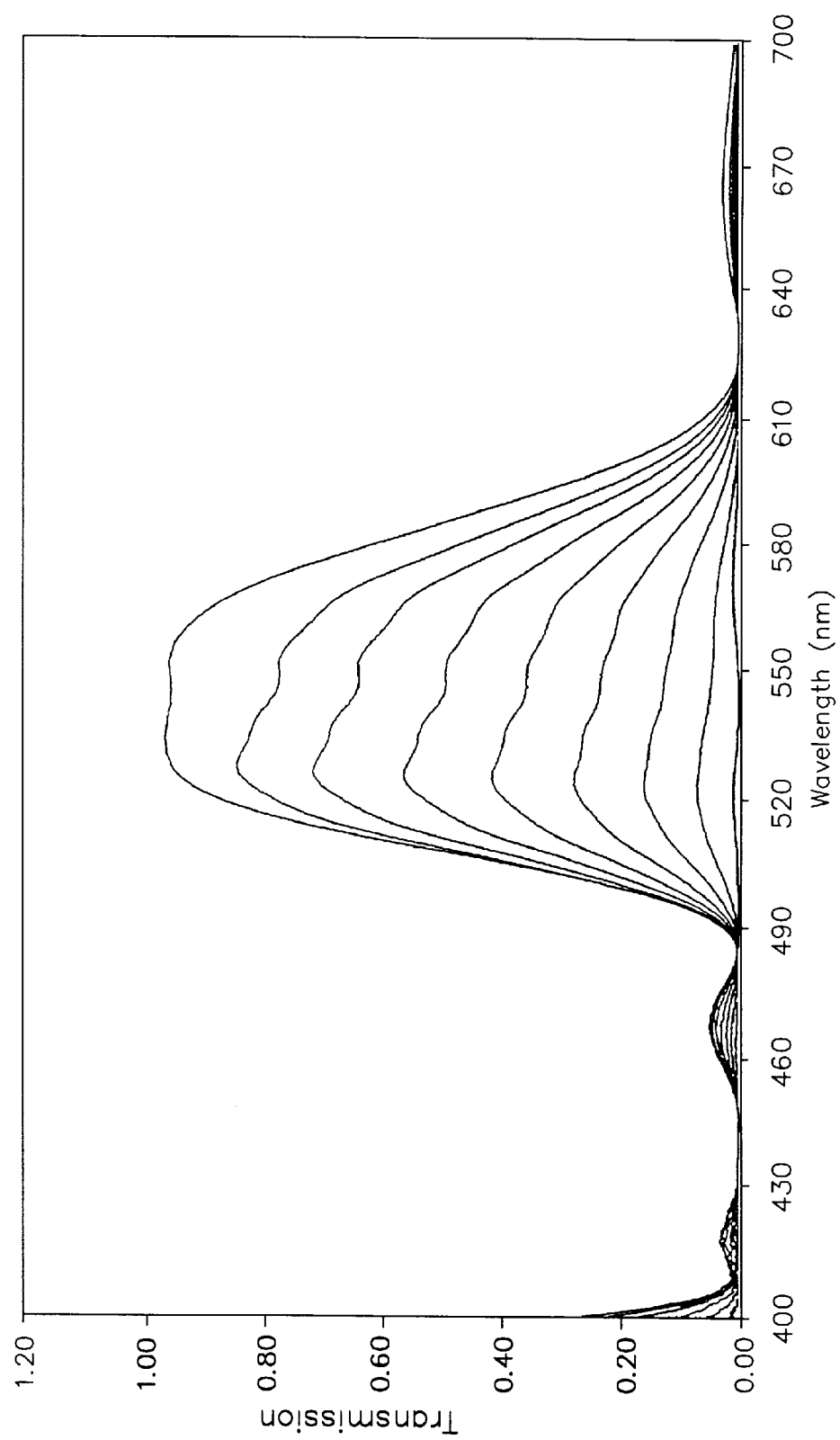
FIG. 7 is a graphical representation of how a color filter embodying the invention can control a specific spectrum of light.

FIG. 7 shows the amount of light transmitted through a color filter such as the one described immediately above for different voltages applied to the modulator 10. In this instance, light in spectrum F is green light between the wavelengths 490 nm and 610 nm. As shown in FIG. 7, the amount of light transmitted through the color filter in the green (F) spectrum can be selectively varied depending upon the voltage applied to the modulator 10.

Many different combinations of retarder stacks, modulators and output polarization analyzers can be used to create different color effects. The details of the different possible combinations are provided in the parent applications referenced above, which are incorporated by reference.

Figure 2:
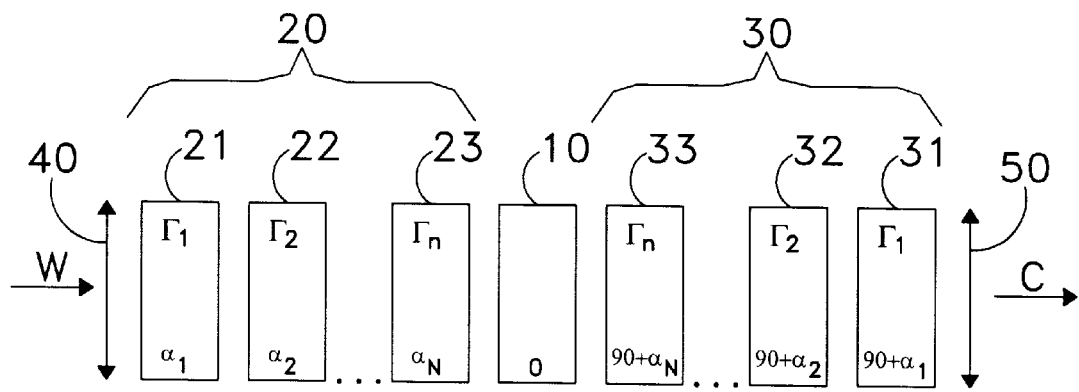
FIG. 2 is a more detailed diagram of a single stage color filter embodying the invention.

FIG. 2 shows a color filter stage similar to the one shown in FIG. 1, however, the retarder stacks are shown in greater detail. The input retarder stack is made up of plural passive retarders 21, 22 and 23. The output retarder stack 30 is also made up of multiple passive retarders 33, 32 and 31. For each individual passive retarder, the orientation of the retarder is given by α and the retardance of the retarder is given by Γ. Thus, the first passive retarder 21 of the input retarder stack has the orientation α1 and the retardance Γ1. The second passive retarder 22 of the input retarder stack 20 has the orientation α2 and the retardance Γ2. Although only three passive retarders are shown in this input retarder stack, any number of passive retarders could be combined to form the input retarder stack 20.

The output retarder stack is essentially the reverse of the input retarder stack. Thus, the first passive retarder 33 of the output retarder stack 30 has the orientation 90+$α_n$ stand the retardance $Γ_n$. The second passive retarder 32 of the output retarder stack has the orientation 90+α2 and the retardance $Γ_2$.

As a result of the above described orientations, the output retarder stack 30 will undo any changes made by the input retarder stack. Additional details regarding the retarder stacks can also be found in the parent applications referenced above, which are incorporated by reference.

Color filters embodying the invention that are capable of controlling more than a single spectrum, or wavelength band, can also be created by combining more than one color filter stages. A two color filter stage embodiment is shown in FIG. 3.

Figure 3:
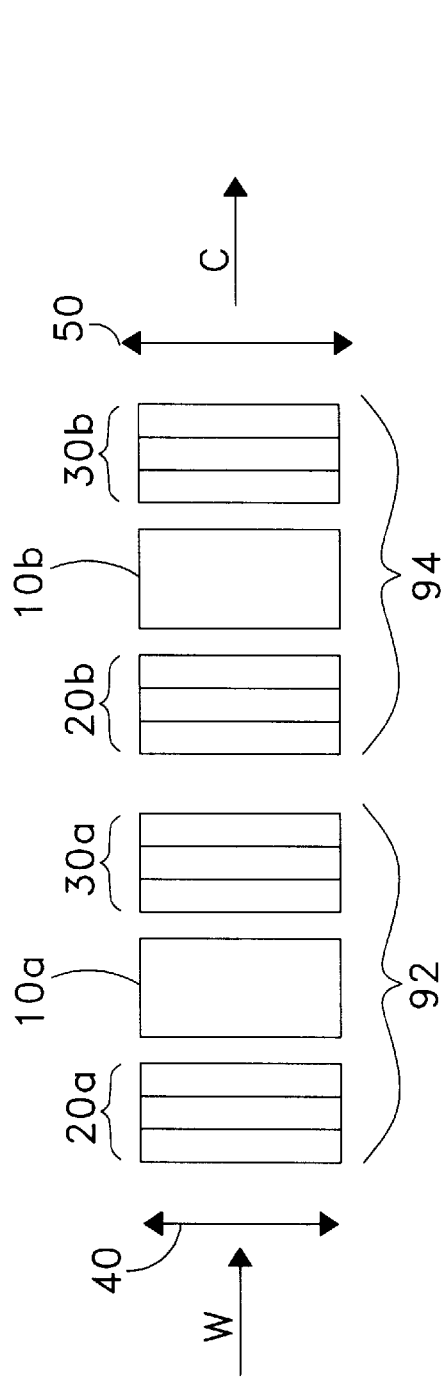
FIG. 3 is a diagram of a two stage color filter embodying the invention.

As shown in FIG. 3, a first color filter stage 92 includes an input retarder stack 20a, a modulator 10a and an output retarder stack 30a. The second color filter stage 94 includes an input retarder stack 20b, a modulator 10b and an output retarder stack 30b. The device also includes an input polarizer 40 and an output polarizer 50 that acts as an analyzer. If the orientations of the retarder stacks and modulators of the two stages 92, 94 are properly designed, there is no need for input and output polarizers at the ends of each color filter stage. However, a color filter having multiple color filter stages could include input and output polarizers associated with each stage.

In the embodiment shown in FIG. 3, the first color filter stage 92 can be used to control a first spectrum of light in a first wavelength band such as the primary color red. The second color filter stage 94 can be used to control a spectrum of light in a second primary wavelength band such as green. Thus, if the first and second color filter stages 92, 94 block all light in the red and green wavelength bands, only blue light would pass through the color filter. If the first color filter stage 92 blocks out red light, and the second color filter stage 94 allows green light to pass through, the light exiting the color filter would be the combination of blue light and green light, which would appear as cyan. Alternatively, if the first color filter stage 92 allows red light to pass, and the second filter stage 94 blocks green light, the light exiting the filter would be the combinations of red and blue light, which would appear as magenta. If the first color filter stage allows red to pass, and the second color filter stage allows green to pass, all wavelengths of light would pass completely through the color filter, and the light exiting the filter would appear as white light.

Although in the embodiment described immediately above, each of the color filter stages is designed to control light in a primary color wavelength band, any other combination of spectrums is possible. For instance, the first color filter stage 92 could be used to control one half of the red wavelength band, while the second color filter stage 94 controls the other half of the red wavelength band. Alternatively, the first color filter stage 92 could control the red wavelength band, while the second color filter stage 94 controls both the green and blue wavelength bands. Any combination of wavelength bands is possible, depending on the design of the retarder stacks and their corresponding modulators.

Figure 4:
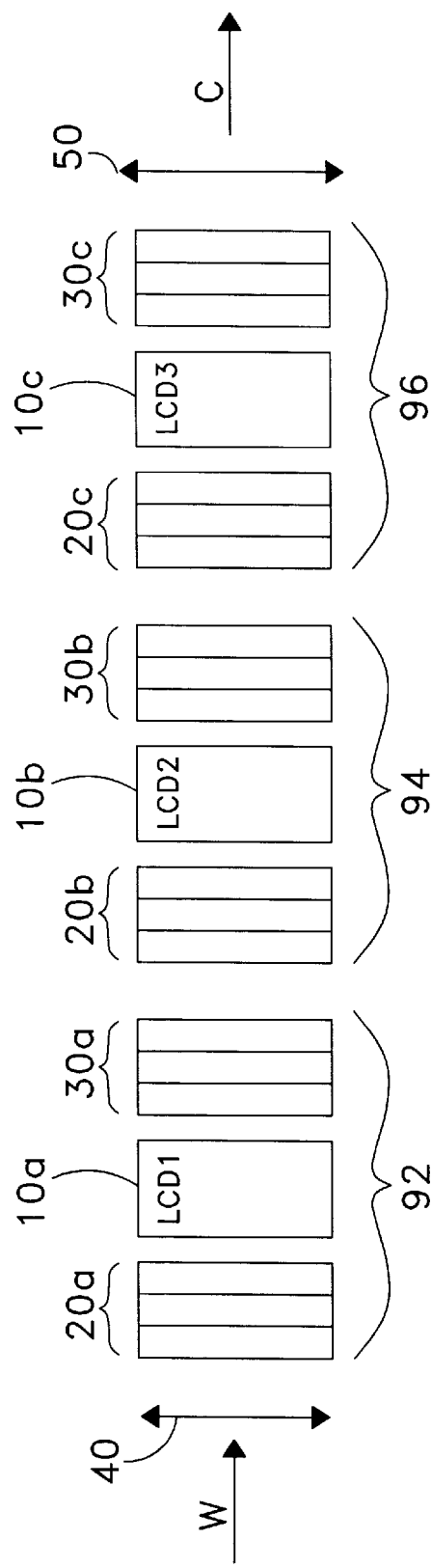
FIG. 4 is a diagram of a three stage color filter embodying the invention.

FIG. 4 shows a color filter embodying the invention that includes three color filter stages. Such a color filter could be used to control three additive primary colors, red, green and blue, or any three other spectrums.

If the embodiment shown in FIG. 4 is designed so that the first color filter stage 92 controls red light, the second color filter stage 94 controls green light, and the third color filter stage 96 controls blue light, the device could use color control signals for existing color display devices, which usually operate based on red, green and blue color control signals. Because each of the individual color filter stages can selectively vary the amount of light in a particular wavelength band, the color filter enables excellent control of the color of light passing through the filter.

Figure 5:
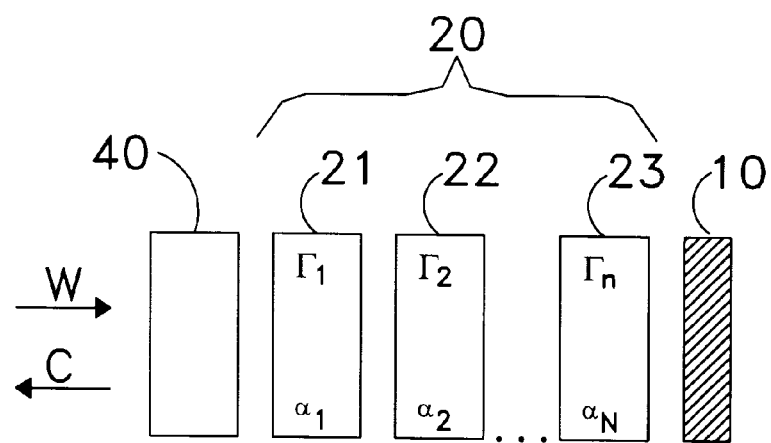
FIG. 5 is a diagram of a reflective color filter embodying the invention.
Figure 6:
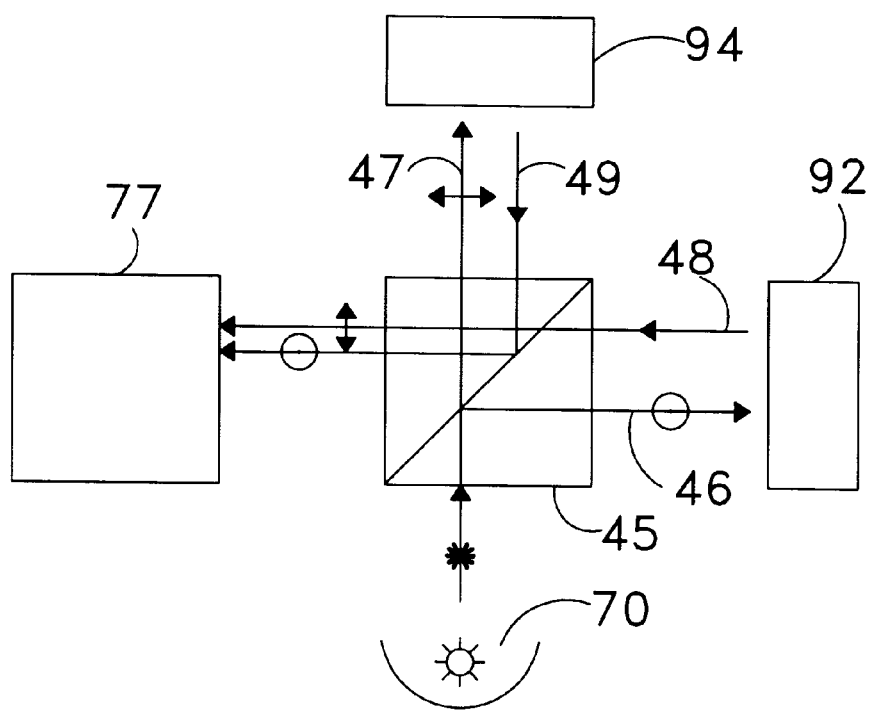
FIG. 6 is a diagram of a two stage color filter and illumination device utilizing reflective modulators.

FIG. 5 shows another color filter design embodying the invention. In this embodiment, the modulator 10 is reflective. Thus, white light W would first pass through an input polarizer 40, then through a retarder stack 20, before striking the reflective modulator 10. The modulator 10 would selectively alter the polarization orientation of light in the modulation state of polarization, depending on the applied voltage, and would reflect the light back through the retarder stack 20. Light in an isotropic state of polarization would be reflected in the same manner, regardless of the voltage applied to the modulator 10. Because the light would then pass through the individual passive retarders of the retarder stack 20 in the reverse order that it first passed through the retarder stack 20, the same effect would be achieved as by sending the modulated light through an output retarder stack as described in FIG. 2. The reflected light exiting the retarder stack 20 would then pass back through the polarizer 40, which would now act as an analyzer.

FIG. 5 shows an example of how reflective color filters embodying the invention can be used to create a projection system. In this embodiment, light created by a light source 70 would be directed into a beam splitting element 45. The un-polarized light entering the beam splitter 45 would be split into a first portion 46 having a first polarization orientation, and a second portion 47 having a polarization orientation orthogonal to the first portion 46. Thus, the beam splitter 45 would serve to split the input un-polarized light into two portions with mutually perpendicular polarization orientations.

The first portion of the light 46 would be acted on by the reflective color filter 92, which would be similar to the one shown in FIG. 5. The reflected light beam 48 would then pass back into the beam splitter 45. The second portion of light 47 would be acted on by the reflective color filter 94, and the reflected light beam 49 would pass back into the beam splitter 49. The two reflected light beams 48 and 49, would then be recombined by the beam splitter 45, which could also act as an analyzer, and the combined beam would be forwarded to projection optics 77. This device could also include a separate output polarizer that acts as an analyzer.

In the following descriptions, various embodiments of the invention utilize various light sources. The light sources could be any type of device capable of outputting light such as light bulbs that utilize a filament, metal halide bulbs, light emitting diodes, fluorescent lights, gas filled discharge tubes, electroluminescent materials, and plasma based light sources that utilize microwaves as an excitation source, such as the devices described in U.S. Pat. No. 5,404,076. Virtually any type of light source could be used in a device embodying the invention.

Indicator lights embodying the invention that utilize color filters as describe above will now be described with reference to FIGS. 8–11.

Figure 8:
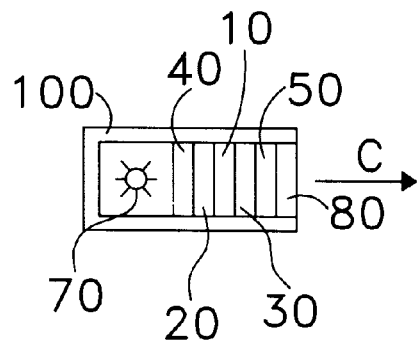
FIG. 8 is a diagram of an indicator light embodying the invention with a single stage color filter.

FIG. 8 shows an indicator light embodying the invention having a single color filter stage. The indicator light includes a housing 100 and a light source 70. The indicator light also includes a bezel 80 on a front surface of the indicator light.

A single stage color filter is interposed between the light source 70 and the bezel 80. The color filter includes a polarizer 40, an input retarder stack 20, a modulator 10, an output retarder stack 30, and an output polarizer 50 that acts as an analyzer. As described above, the characteristics of the color filter stage can be designed so that the color filter controls any spectrum of light.

In one embodiment, the color filter could be switched between a first state where all light from the light source is blocked, to a second state where a single spectrum of light is emitted through the bezel 80 as a beam of colored light C. In alternate embodiments, the color filter stage could be designed so that the indicator light switches between a first state where all wavelengths of light from the light source 70 are emitted through the bezel to a second state where only light in a particular spectrum is emitted through the bezel 80. Also, by applying various voltages to the modulator 10, one could selectively vary the characteristics of the output light beam to any of multiple intermediate states between the two states described above.

An indicator light as shown in FIG. 8 could be incorporated into any type of device that currently uses indicator lights. For instance, the indicator light could be used on appliances, computers, office equipment such as copiers, fax machines and printers, or in vehicles such as automobiles, motorcycles, boats and other watercraft, and various types of aircraft.

Because a modulator can be used to selectively control the color of the light output through the bezel 80, one can achieve a much greater degree of flexibility and control than is currently possible with light emitting diodes or a simple arrangement including a lightbulb and a colored bezel plate.

Figure 9:
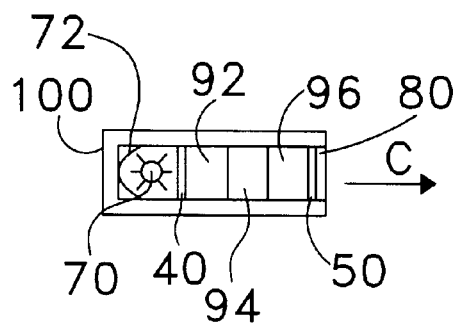
FIG. 9 is a diagram of an indicator light embodying the invention with a three stage color filter.

A second type of indicator light that includes three separate color filter stages is shown in FIG. 9. This indicator light includes a housing 100, a bezel 80, a light source 70, and a reflector element 72. The reflector 72 ensures that a majority of the light output by the light source 70 is aimed forward through the color filter stages and out through the bezel plate 80. A reflector 72, as shown in FIG. 9, could also be used in the indicator light shown in FIG. 8.

The color filter portion of the indicator light shown in FIG. 9 includes a first color filter stage 92, a second color filter stage 94 and a third color filter stage 96. An input polarizer 40 is located between the light source 70 and the first color filter stage 92. An output polarizer 50, which acts as an analyzer, is located between the third color filter stage 96 and the bezel plate 80.

As described above, the three color filter stages can be designed to control any three spectrums of light generated by the light source 70. Thus, the three color filter stages could be used to control red, green and blue spectrums of light, thereby providing control over three additive primary colors. In an alternative embodiment, the three color filter stages could be used to control three subtractive primary colors such as magenta, cyan and yellow. Furthermore, the three color filter stages need not control the majority of the visible light spectrum. Instead, all three color filter stages could control a narrow portion of a single primary color, or narrow portions of more than one primary color. Still further, the three color filter stages could be used to control spectrums of light outside the visible light spectrum, such as ultraviolet or infrared light.

An indicator light as shown in FIG. 9 could be used so that a single indicator light can be easily and rapidly switched between several different colors, or different intensities. Each color could indicate a different condition for a device that uses the indicator light. For instance, an indicator light as shown in FIG. 9 could indicate the status of a battery of a personal computer or other electrical device. When the battery is at full strength, the three color filter stages could be used to output green light. When the battery begins to reduce its charge potential, the color filter stages could be used to output yellow light. When the battery is nearing the end of its useful life, the three color filter stages could be used to output red light. This would provide a user of an electronic device with a constant indication of the condition of the battery with only a single indicator light.

In addition, the modulators of the color filter stages embodying the present invention can be very rapidly switched between different states. Thus, by simply switching the voltages applied to the modulators of the three color filter stages, one could quite rapidly switch between different colors. The rapid switching of colors could be useful in a variety of different contexts.

Note that each of the color filter stages of the indicator light could include only an input retarder stack and a modulator. A color filter stage may or may not have an output retarder stack. Also, it is only necessary to use a single input polarizer 40 and a single output polarizer 50. However, in alternate embodiments, each of the color filter stages could include their own input and output polarizers.

Figure 10:
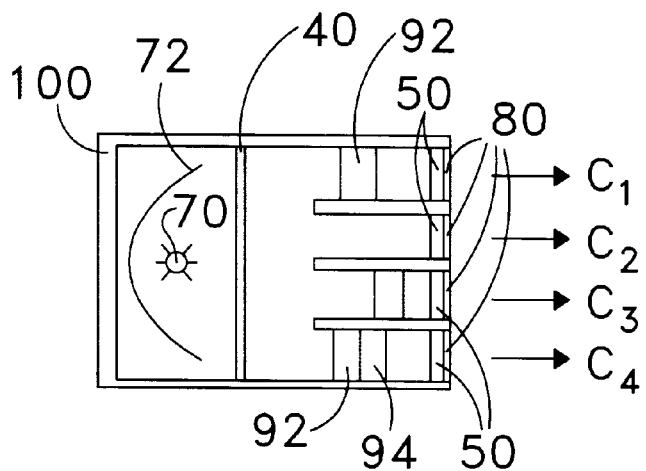
FIG. 10 is a diagram of an indicator light array embodying the invention.

An indicator light array embodying the invention is shown in FIG. 10. The indicator light array includes a housing 100 and one or more bezels 80 covering a plurality of different indicator lights within the array. The indicator light array also includes at least one light source 70 and a reflector 72. Although only a single light source 70 and reflector 72 are shown in this embodiment, it would be possible to have multiple light sources and/or multiple reflectors.

The indicator light array further includes at least one input polarizer 40 and one or more output polarizers 50 that act as analyzers. Although in this embodiment, only a single input polarizer is shown, each of the indicator light sections of the indicator light array could have their own input polarizer 40. Also, although in this embodiment each of the indicator light portions includes its own separate output polarizer 50, a single output polarizer could be used instead of providing multiple output polarizers 50. Furthermore, within each indicator light portion, each color filter stage could include its own input polarizer and output polarizer. The ultimate design of any particular indicator light array would depend upon the requirements for the array.

Each of the indicator lights within the indicator light array could include a single color filter stage, or multiple color filter stages designed to provide control over more than one spectrum of light. For instance, in the top-most indicator light portion shown in FIG. 10, only a single color filter stage 92 is provided. In the bottom-most indicator light portion shown in FIG. 10, both a first color filter stage 92 and a second color filter stage 94 are provided. Another of the indicator light portions includes four color filter stages for controlling four different spectrums of light.

Each of the indicator light portions of the indicator light array output a separate light beam. As shown in FIG. 10, the top-most indicator light portion outputs a colored light beam C1, the next lower indicator light portion outputs beam C2, the next lower indicator light portion outputs beam C3, and the lowest indicator light portion outputs beam C4. Each of the indicator light portions can be separately controlled by their respective color filter stages to control the color and/or multiple of the output light beam. Depending upon the design of the color filter stages, a particular indicator light could also be controlled to block all light or pass all light.

Furthermore, in each of the embodiments shown above, the light sources 70 output polarized or unpolarized light. If the light is unpolarized, then the light is passed through a polarizer or polarization conversion system 40 so that the light entering each of the color filter stages is initially polarized in a single direction. Suitable polarizers include DBEF™ from 3M, Transmax™ from Philips. If the light sources 70 output polarized light, such as laser light sources, it would not be necessary to have an input polarizer 40 between the light source and the color filter stages.

Figure 11:
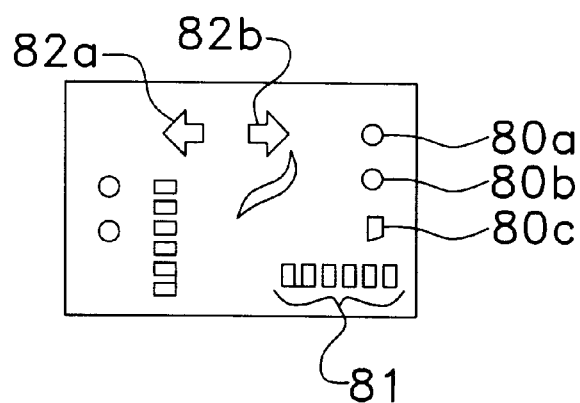
FIG. 11 is a diagram of a face plate of an indicator light array embodying the invention.

FIG. 11 shows the front of an indicator light array embodying the invention. As shown therein, a plurality of indicator lights are arranged in various patterns, and each indicator light has a particular shape. The shape of the indicator light could be controlled by the shape of one or more bezels interposed between the exterior of the indicator light array and the color filter stages.

In the indicator light array shown in FIG. 11, two circular bezels cover two corresponding indicator light portions 80*a* and 80*b* located in the upper right portion of the array. This would provide circular indicator lights. Immediately beneath these two circular indicator lights is a square shaped bezel covering another indicator light portion 80*c*. Beneath those indicator lights is a plurality of rectangular shaped bezels which would correspond to a plurality of indicator light portions 81, each of which have their own color filter stages. The plurality of indicator lights 81 form a sub-array. All of the indicator lights 81 in the sub-array could be used together to provide an indication of a particular function. Similarly, at the top of the indicator light array there are two arrow shaped bezels covering indicator lights 82*a* and 82*b*. Again, these two indicator lights could be used together to indicate a particular function. By controlling the shape of the bezel, one can control the shape of the light output by each indicator light portion within the array.

As mentioned above, most existing stage lighting devices configured to output a single color of light include a dyed gel or a vacuum deposited thin film of dichroic material as a color filter. A illumination device embodying the present invention that could be used in place of such existing lighting devices is shown in FIG. 12A.

Figure 12A:
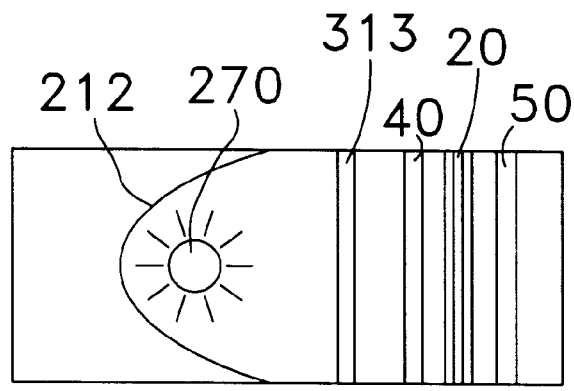
FIG. 12A is a diagram of a simple illumination device embodying the invention.

The illumination device in FIG. 12A includes a light source 270 and a reflector 212 for reflecting most of the light produced by the light source 270 in a single direction. A heat shield 313 may be located between the light source 270 and the color filter elements of the device.

The heat shield 313 may be configured to reflect the infrared portion of the spectrum to reduce the amount of energy that passes from the light source 270 to the color filter elements. This protects the color filter elements from high temperatures that could be damaging. In some embodiments, the heat shield could be one or more layers of plastic coated with Indium Tin Oxide (ITO), with the ITO coating facing the light source 270. One suitable heat shield is the ThermaShield manufactured by Rosco Laboratories, Inc., of Port Chester, N.Y.

The color filter elements include an input polarizer 40, a retarder stack 20, and an output polarization analyzer 50. The retarder stack 20 can be a single layer, or can include multiple layers as described above. The characteristics of the layers of the retarder stack are designed to cause the illumination device to output a specific color of light.

Figures 12B, 12C:
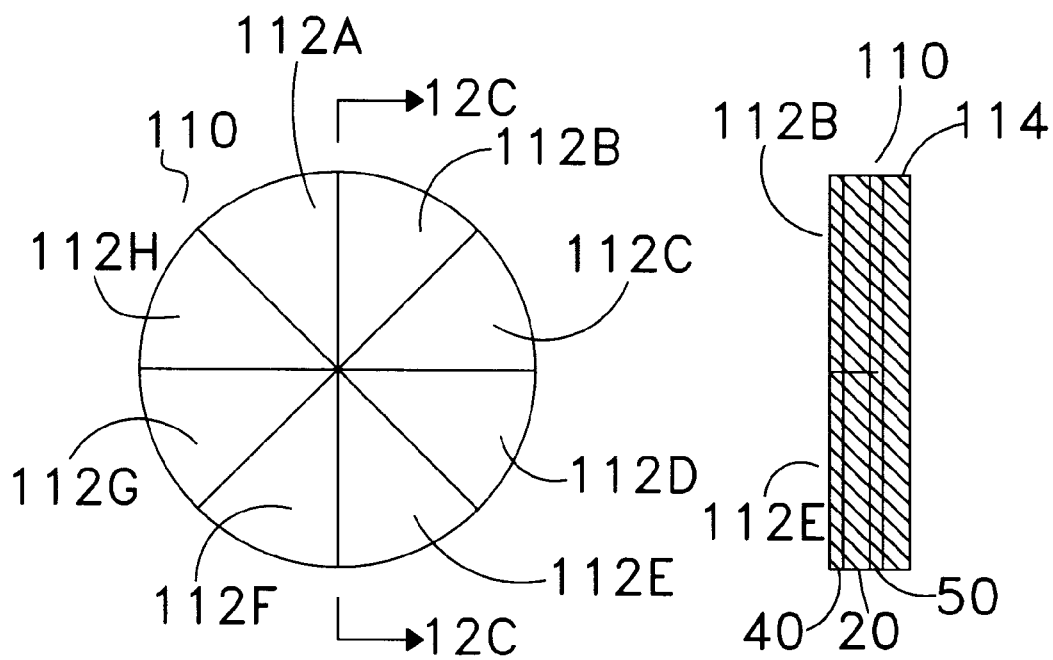
FIG. 12B is a diagram of a color wheel embodying the invention that can be incorporated into a illumination device suitable for stage lighting.
FIG. 12C is a cross-sectional view of the color wheel shown in FIG. 12B taken along section line 12C—12C.

A color wheel, embodying the present invention, that can be used on a stage lighting device configured to output multiple different colors of light is shown in FIGS. 12B and 12C. FIG. 12C presents a cross-sectional view of the color wheel of FIG. 12B taken along section line 12C—12C.

The color wheel includes a substrate 114. A first polarizer layer 40, a retarder layer 20, and a second polarizer layer 50 are formed on the substrate 114. The retarder layer 20 is separated into multiple different regions, each of which has different characteristics that result in the generation of a different color of light. The different regions 112A—112H are arranged as pie-shaped portions of the entire wheel. Although a circular wheel with pie-shaped regions is shown in this embodiment, any other arrangement or shapes could be provided for the color wheel, and the different regions. For instance, instead of a color wheel, the filter could be arranged as a rotatable roller with shaped filter portions, where the roller can be rotated to position different regions of the roller in the path of a beam of light.

The color wheel shown in FIGS. 12B and 12C could be substituted for existing color wheels of stage lighting devices that include mechanical switching mechanisms for switching to different output colors.

The color filter shown in FIG. 12A and the color filter wheel shown in FIGS. 12B and 12C are superior to existing dyed gels and vacuum deposited thin films of dichroic materials in several aspects. The color filter embodying the present invention is less expensive than the vacuum deposited dichroic thin films. It is also capable of providing a wider field of view than the vacuum deposited dichroic thin films, which can become important for certain lighting applications. Also, a color filter embodying the invention is better able to withstand high temperatures, and can give better saturated color output, especially in the long run after the prior art materials begin to degrade.

Another illumination device embodying the invention is shown in FIG. 13. The illumination device includes a housing 210, a light source 270, a reflector portion 212, a heat shield 313, a color filter portion 220 and an output bezel 214. The reflector portion 212 ensures that a majority of the light output by the light source 270 is aimed through the color filter 220 and out through the bezel 214.

The color filter 220 in this embodiment includes an electrically switched modulator. The color filter could include a single color filter stage, or multiple color filter stages as described above. Thus, depending upon the design of the color filter 220, the illumination device could output varying amounts of a single spectrum of light, or the illumination device could be controllable to switch between a nearly infinite variety of different colors. Also, depending upon the design of the color filter 220, the illumination device could be configured to switch between infrared light, visible light, and ultraviolet light.

An illumination device as shown in FIG. 13 could be used for interior lighting within a home or office, for exterior lighting of buildings or other items, or for specialized theatrical or stage lighting where the switching of different colored lights is desired. An illumination device as shown in FIG. 13 could be used as a recessed or track lighting spotlight in interior applications, or as an exterior spotlight. In other embodiments, the lighting device shown in FIG. 13 could be incorporated into various free-standing lamps, or various desk or table lamps.

An alternate illumination device embodying the invention is shown in FIGS. 14, 15A and 15B. In this illumination device, a support member 224 supports the actual light providing portion. The light providing portion would include a light source 270 within the interior of the illumination device, and a color filter 220 for conditioning light output by the light source 270. In some embodiments, the color filter 220 could be curved or shaped so that it surrounds the illumination device 270. However, there is no need for the color filter to be curved or shaped. A heat shield may be positioned between the light source and the color filter. An optional cap member 222, which could be reflective, could be provided on top of the color filter portion 220.

FIG. 15A is a sectional view of the illumination device shown in FIG. 14 taken along section line 15—15 in FIG. 14. As shown in FIG. 15A, a light source 270 is located in the center of the illumination device, a color filter 220 surrounds the illumination device 270, and a heat shield 313 is interposed between the light source 270 and the color filter 220. As with the embodiment shown in FIG. 13, the color filter 220 could include a single color filter stage, or multiple color filter stages to provide switching between a plurality of different spectrums of light. Although the color filter in this embodiment is shown as generally cylindrical, the color filter 220 could be shaped into a variety of other forms depending upon design requirements.

FIG. 15B is a sectional view of an alternate embodiment of the illumination device shown in FIG. 14 taken along section 15—15. In this embodiment, the illumination device 270 is surrounded by a heat shield 313 and two separate color filter portions 220a and 220b. Each of the color filter portions 220a, 220b could contain a single color filter stage or multiple color filter stages. This would allow a first portion of the exterior of the illumination device to exhibit one color, while a second portion of the illumination device exhibits a different color. As described above for the embodiment in FIG. 15A, the color filters 220a and 220b could be designed to have any type of shape depending upon design requirements. Furthermore, although only two color filters are shown in the embodiment of FIG. 15B, any number of separate color filters could be provided around a single light source depending upon design requirements. For instance, three or more flat color filters could be combined to surround a light source. Furthermore, although the embodiments shown in FIGS. 14, 15A and 15B only include a single light source, multiple light sources could be provided. If multiple light sources are provided, each light source could output the same basic spectrum of light, or different light sources could output different spectrums of light.

An illumination device embodying the invention and suitable for theatrical or stage lighting is shown in FIG. 16. The device includes a main body portion 300 which houses at least one light source, and a bracket 302 for mounting the device. A color filter 220, as described above, is attached to the main body 300 of the illumination device with an attachment device 226. Electrical wiring 222, for controlling one or more modulators of the color filter 220, is connected to the color filter 220 and terminates in a connector 224.

Prior art illumination devices for theatrical and stage lighting typically use a white light source, and a transparent color filter which is attached to the main body of the light. The transparent color filter is used to generate a particular colored light beam which is then aimed at the appropriate portion of a theater or stage. This means that each such illumination device can only create a single colored light beam. Also, the transparent color filters can tear or even melt under the heat of the light source.

Some prior art theatrical and stage lighting devices include a device for physically switching one colored filter with another colored filter under the direction of an electrical control signal. This requires some type of mechanical switching device to substitute the first colored filter for the second colored filter. An example of such a device is shown in U.S. Pat. No. 4,745,531, which was issued May 17, 1998, the contents of which are hereby incorporated by reference.

In contrast to the device shown in U.S. Pat. No. 4,745,531, an illumination device embodying the present invention uses a non-moving electro-optic color filter 220 to selectively switch between different spectrums of light. The electro-optic color filter 220 can include a single color filter stage as described above, or multiple color filter stages for generating multiple different colored light beams. The electro-optic color filter 220 eliminates the need for a mechanical switching device, thus reducing the complexity of the device and increasing reliability. Instead, only relatively small voltages need be applied to the modulators of the color filter stages to vary the color output by the illumination device. Also, the electro-optic color filter 220 is capable of being switched between different colors much more rapidly than existing mechanical switches.

Furthermore, prior art stage lighting devices having switchable transparent color filters, can only switch between a limited number of different colors. In contrast, a multi-stage color filter embodying the present invention would allow a theatrical or stage lighting device to switch between nearly an infinite number of different colors simply by adjusting voltages applied to the modulators in each color filter stage of the device.

In alternate theatrical and stage lighting devices, the lighting device can include a plurality of light sources, where each individual light source produces one of a plurality of different colors of light. For instance, an illumination device of this type could incorporate a single red light source, a single blue light source, and a single green light source. By selectively altering the amount of light output by each of the individual light sources, one could selectively vary the color of the output light beam. Furthermore, such a lighting device could incorporate a large number of relatively small light sources, where each of the individual light sources output one of a plurality of different colors of light. An example of such a device is shown in U.S. Pat. No. 5,752,766, which was issued May 19, 1998, the contents of which are hereby incorporated by reference.

A theatrical or stage lighting device embodying the present invention, which incorporates an electro-optic color filter 220 has several advantages over the illumination device described in U.S. Pat. No. 5,752,766. For instance, a theatrical or stage lighting device embodying the present invention need only incorporate a single illumination device. This reduces the cost of the light, the power to generate the light, and increases the reliability. Also, in order to change the color of light output by the light source described in U.S. Pat. No. 5,752,766, one must turn some light sources off and possibly turn other light sources on. There is a time lag associated with these changes in the light output of the individual illumination devices. In contrast, an electro-optic color filter can be much more rapidly switched between different colors. Some embodiments of the color filters of the present invention can switch between two colors in less than 100 microseconds.

A more detailed diagram of an illumination device embodying the invention that could be used for theatrical or stage lighting is shown in FIG. 17A. This illumination device includes a light source 370, and a reflector 312 that ensures a majority of the light produced by the light source 370 will be directed through the color filter and out of the device. A heat shield 313, such as an ITO coated plastic, is interposed between the light source and the remaining components of the lamp.

The device also includes a bracket 302 for mounting the illumination device to a stationary object. The mounting bracket incorporates a motor 304 which can be used to rotate the illumination device in the direction of arrows 303 to selectively aim a light beam output by the illumination device. Similar electric motors could be provided to enable the illumination device to be selectively moved in other degrees of freedom.

The illumination device also includes two focusing lenses 320, 322 which can be used to focus a light beam output by the device. The focusing lenses 320, 322 are movable along guide rails 324, 326 in the direction of arrows 323. Movement of the lenses 320, 322 could serve to alter the effective beam width, or to focus the light beam at different focal lengths.

The illumination device further includes movable shutters 340, 342 which can be moved in the direction of arrows 343 by actuation devices 344, 346. Selective movement of the shutters 340, 342 can alter the effective beam width of the light output by the illumination device.

An electro-optic color filter 220, as described above, is also attached to the illumination device. The color filter 220 can include a single color filter stage or multiple color filter stages. The way in which the color filter 220 is attached to the illumination device is variable depending upon the design requirements of the device. The color filter 220 could be removable so that one color filter can be switched with another.

Some embodiments of the invention could also include an electronically switchable light modulator device 221. The light modulator device 221 could be any type of light modulating device configured to selectively pass light based on an electronic signal. For instance, the light modulator 221 could be a transmissive liquid crystal modulator that has a plurality of individually controllable pixels 225. Each pixel would be controlled to block or pass light. A perspective view of such a light modulator is shown in FIG. 17B.

When a light modulator device 221 is positioned at the output of a light source embodying the invention, as shown in FIG. 17A, the projected light beam can be selectively controlled by controlling the transmissive states of the individual pixels 225. For instance, light in the shape of text characters could be allowed to pass through the light modulator device 221, while all remaining light is blocked. Alternatively, light in the shape of text characters could be blocked, while the remaining light is allowed to pass through the light modulator device 221.

In still other embodiments of the invention, the light modulator device could be a reflective light modulator. In these embodiments, light would exit a color filter and impinge on the reflective light modulator. The light modulator would be controlled to selectively reflect or block the light in a particular pattern. The reflected light would then be projected to obtain a desired lighting effect.

Figure 18:
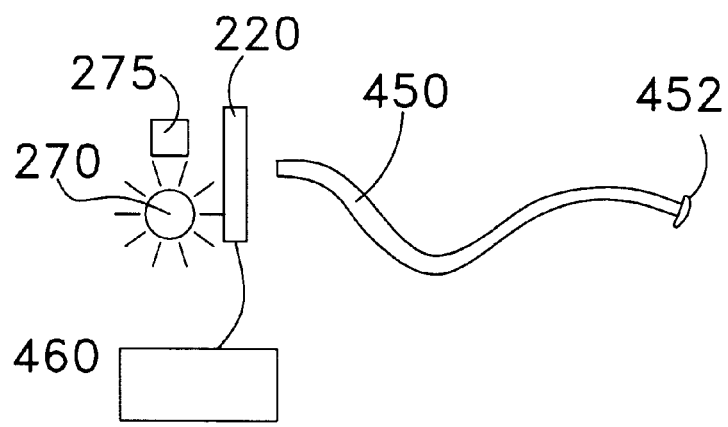
FIG. 18 is a diagram of a diagnostic testing device embodying the invention.

A diagnostic testing device embodying the invention is shown in FIG. 18. The device includes control electronics 460 attached to an electro-optic color filter 220. The device also includes a light source 270, a detector 275, a flexible light conduit 450 and an end cap 452.

The light source 270 could be any type of device capable of outputting light. The flexible light conduit 450 could include one or more optical fibers, or any other type of light conducting device. The end cap 452 could include focusing optics, and could be specifically designed to contact a material or tissue to be tested. The flexible light conduit 450 and end cap 452 could also include a variety of other aiming and movement devices as would be well known to those skilled in the art.

The control electronics 460 would include a processor and appropriate other electronic equipment for controlling at least the modulator of color filter stages located in the color filter 220. The control electronics could also exert control over the light source 270, the detector 275 and over any type of aiming and control mechanisms used for the flexible light conduit 450.

A device as shown in FIG. 18 could be used to conduct medical testing in vitro or in vivo. It is well know in the medical arts that by exciting body tissues with light at specific wavelengths, the tissues can be induced to emit flourescent or phosphorescent light. The wavelength and amplitude of the emitted fluorescent or phosphorescent light can be used to diagnose certain medical conditions.

In order for such a testing device to be optimally efficient, the device must excite the body tissue with the appropriate wavelengths of excitation light. An electro-optic color filter 220, as described above, is ideal for providing light having selected wavelengths. The color filter stages of such a color filter 220 can be designed to pass only specific wavelengths of light which would be useful for a medical diagnostic test.

Figure 19:
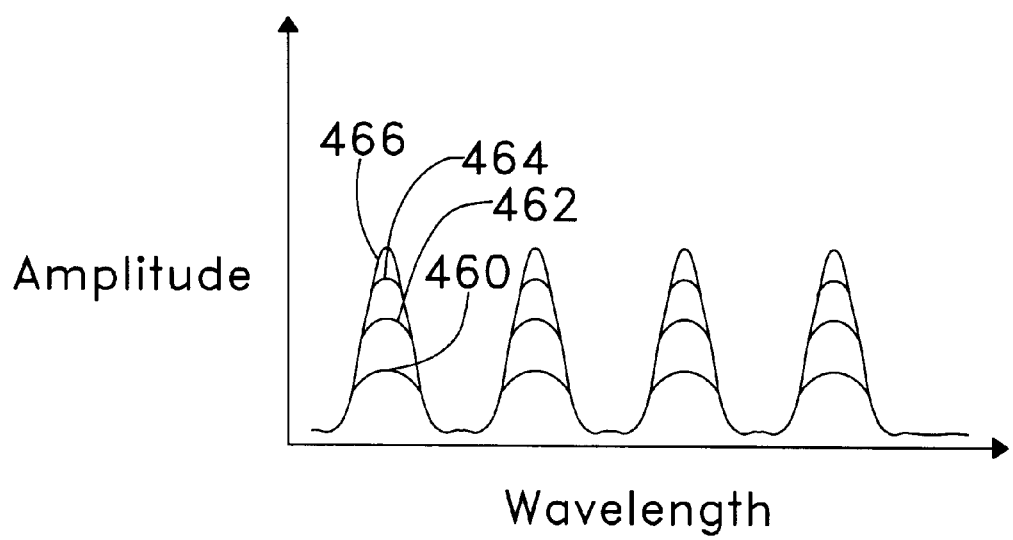
FIG. 19 is a graph showing how a color filter embodying the invention can selectively control multiple different spectrums of light.

FIG. 19 shows a variety of curves representing the amplitude of light output by a color filter 220 of one testing device embodying the invention. The line 460 represents light output at selected wavelengths having a relatively low amplitude. By exerting control over the modulators of the color filter 220, the amplitude of the light at the selected wavelengths can be gradually increased to provide the spectrum represented by lines 462, 464 and 466. Also, by selectively applying voltages to a plurality of modulators for different color filter stages of a color filter embodying the invention, the light output at the end cap 452 of the device show in FIG. 18 can be rapidly switched between different discrete spectrums of light. This would allow a diagnostic testing device embodying the invention to conduct a plurality of different tests using different excitation wavelengths.

In addition, flourescent or phosphorescent light output by the body tissues under examination can be gathered by the flexible light conduit 450 and transmitted back through the color filter 220 to a detector 275. The detector 275 would sense the amplitude, and possibly the wavelengths, of light output by the tissue under examination that is passed through the color filter 220.

Because the color filter 220 could be designed to pass only particular wavelengths of light that are indicative of a particular medical condition, the photodetector 275 need not be designed to sense particular wavelengths of light. Also, because the color filter 220 is switchable, the color filter 220 can be used to select different wavelengths from the fluorescent or phosphorescent light output by the tissue for detection at several different wavelength bands.

It is known that body tissues will begin to emit fluorescent light only after a period of time has elapsed after the beginning of excitation. It is also known that the tissues will continue to emit fluorescent light for a period of time after excitation has ended. These characteristics of the fluorescent light emission can be exploited by a testing device embodying the invention that includes an electro-optic color filter. Because a color filter 220 embodying the invention can rapidly switch between different states, the color filter 220 could switch between a first state where it passes the appropriate wavelengths of excitation light produced by the light source 270 onto the tissue, to a second state where passes only selected wavelengths of light produced by the tissue onto the detector 275. Thus, the color filter 220 could alternately act as an output color filter and an input color filter. By combining multiple color filter stages, the color filter 220 could be used to conduct multiple different tests at multiple different excitation and fluorescent emission wavelengths.

Although the above described embodiment was for medical testing of body tissue, a testing device as described above could be used for many other purposes for detecting a characteristic or condition of any type of tissue or material.

Figure 20:
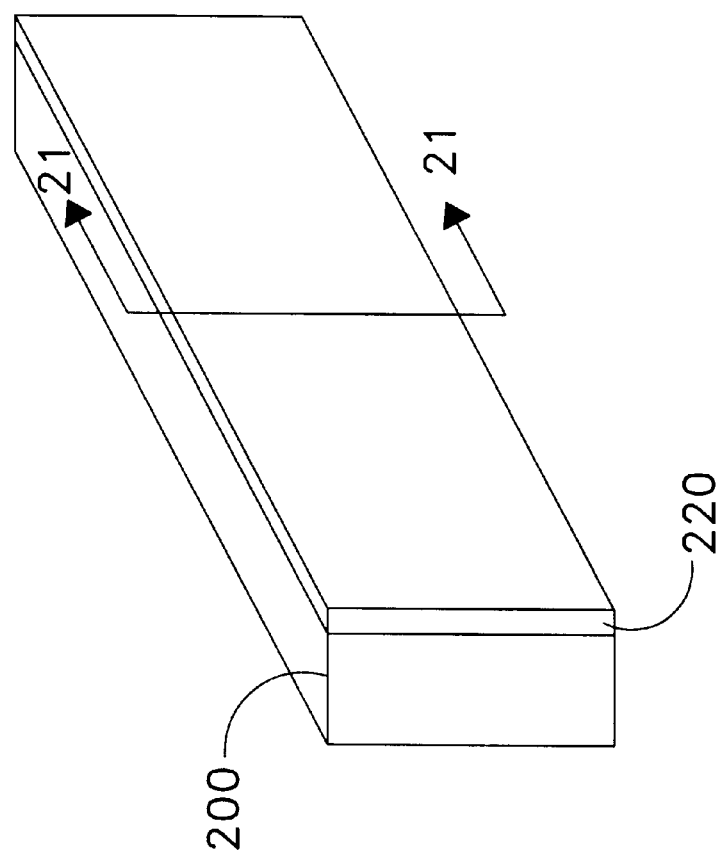
FIG. 20 is a diagram of a window and a color filter embodying the invention.

A color filter as described above could also by used to create a color controlled transmissive window embodying the invention. FIG. 20 shows a color filter 220 applied to one side of a transparent or transmissive window 200. By selectively applying voltages to one or more color filter stages of the color filter 220, one could easily control the spectrum of light transmitted through the window. Because the electro-optic color filters can be made extremely thin, using thin glass or plastic liquid crystal cells, applying a color filter 220 to a window 200, as shown in FIG. 20, should not add a significant thickness to the window.

Figure 21:
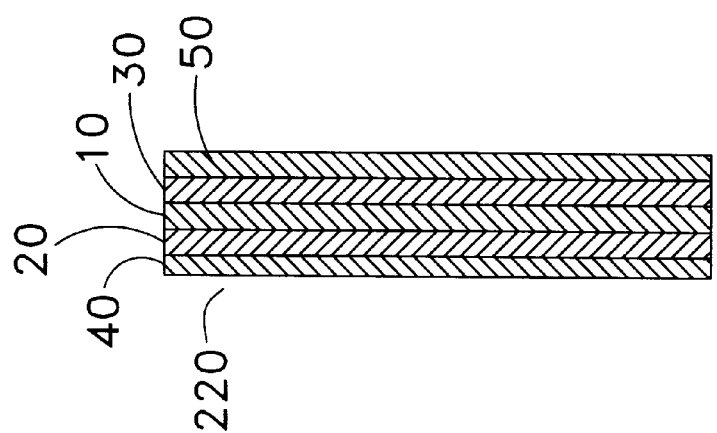
FIG. 21 is a sectional diagram of the color filter shown in FIG. 20 taken along section line 21—21.

A cross sectional view of the color filter 220 taken along section 21—21 in FIG. 20 is shown in FIG. 21. As seen in FIG. 21, the color filter 220 includes a polarizer 40, a first retarder stack 20, a modulator 10, a second retarder stack 30 and an output polarizer 50. Thus, the design of this color filter is a single stage color filter as described above. However, the color filter 220 could include multiple color filter stages as also described above.

The combination of the color filter and a transparent window could be used in a variety of different context. For instance, this combination could be used on a cover plate of an electronic display to control the color of light emitted by the display. The color filter could also be used on building windows to control the amount and spectrum of light transmitted through the window. This would allow the windows to respond to existing environmental lighting conditions. The color filter could be completely clear in its unactivated state and could provide a high level of tinting when activated to reduce the amount of light entering a building during extremely bright environmental lighting conditions. Also such a filter could be used to block undesirable wavelengths of light that must be kept out of certain areas of a building. For instance, a color filter embodying the invention could be applied to windows of a film developing lab, an optical laboratory, or a research facility to remove harmful wavelengths of light that would otherwise be transmitted through the window.

Figure 22:
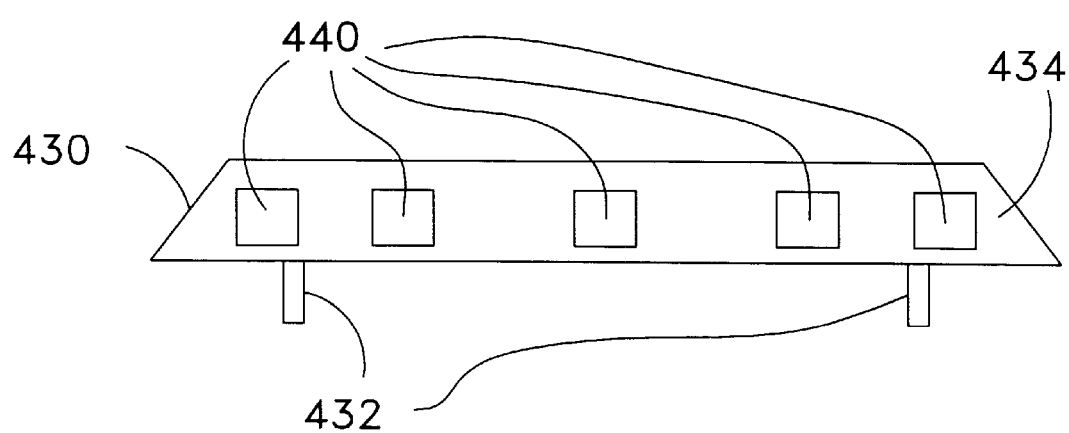
FIG. 22 is a diagram of a set of warning lights embodying the invention which can be attached to a vehicle.

FIG. 22 shows an array of warning lights 430 embodying the invention. The lighting device 430 includes a plurality of individual lights 440, which could be strobe lights or rotating lights. A transparent window 434 surrounds all of the individual lighting devices 440.

A color filter could be applied to the window 434 to selectively change the color of light transmitted through the window 434. Alternatively, a color filter as described above could be applied to each of the individual lighting elements 440 so that the color of each lighting element could be selectively controlled.

Although the above described embodiments have provided several examples of how an electro-optic color filter could be used in conjunction with indicator lights, illumination devices, and various other apparatus, the description provided herein is not intended to be limiting. An electro-optic color filter could be used in a great variety of different contexts where rapid and variable control of a spectrum of light is necessary. For instance, devices embodying the invention could be used to provide color controlled lighting for concerts, commercial and residential architecture applications, and for television, film and other video recording sets.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modification, and variations will be apparent to those skilled in the art. In the claims, means-plus-function clauses are intended to cover the structures described herein as performing the recited function and not only structural equivalents but also equivalent structures. For example, although an incandescent lamp and a light emitting diode may not be structural equivalents in that an incandescent lamp employs a filament to produce light, whereas a light emitting diode uses a diode to produce light, in the environment of light sources, an incandescent lamp and a light emitting diode may be equivalent structures.

What is claimed is:

1. An illumination device, comprising:

a light source; and at least one non-moving electro-optic color filter stage configured to selectively vary a respective predetermined spectrum of light output by the illumination device in response to a color signal, wherein the al least one electro-optic color filter stage comprises, an input retarder stack that transforms a polarization state of the respective predetermined spectrum of light into a modulation state of polarization, and a modulator, optically coupled to the retarder stack, adapted to operate on light having the modulation state of polarization more than light having other states of polarization.

2. The illumination device of claim 1, wherein the at least one electro-optic color filter stage comprises at least two electro-optic color filter stages that selectively vary at least two respective spectra of light output by the illumination device.

3. The illumination device of claim 1, wherein the at least two color filter stages are arranged inseries, and wherein the at least two respective predetermined spectra are not co-extensive.

4. The illumination device of claim 1, wherein the electro-optic color filter stage further comprises a polarization analyzer.

5. The illumination device of claim 1, wherein the electro-optic color filter stage further comprises an output retarder stack.

6. The illumination device of claim 1, further comprising a housing configured for use in stage lighting applications.

7. The illumination device of claim 1, wherein the device is configured to provide a beam of light suitable for stage lighting.

8. The illumination device of claim 1, further comprising a housing, wherein the light source and the at least one electro-optic color filter stage comprise at least one indicator light in the housing.

9. The illumination device of claim 1, wherein the light source comprises at least one of the group consisting of an incandescent light, a fluorescent light, a halogen light, a metal halide light, a tungsten light, a gas filled discharge tube, a plasma light, a laser light, a vertical cavity surface emitting laser light, and a light emitting diode.

10. The illumination device of claim 1, further comprising a rotatable mount configured such that light output by the illumination device can be aimed in a plurality of directions.

11. The illumination device of claim 1, wherein the modulator comprises a pixelated modulator.

12. The illumination device of claim 11, wherein the modulator comprises at least one device selected from the group consisting of: a STN, TN, VAN, HAN, FLC, or polysilicon TFT LCD, and a reflective modulator.

13. The illumination device of claim 1, wherein the device is configured to provide a beam of light suitable for indoor or outdoor lighting applications.

14. An illumination device, comprising:

a light source;

a retarder stack arranged to receive light from the light source, wherein the retarder stack comprises at least two retarder films each having s retardance and an orientation selectively matched to a spectral output of the light source, such that a desired spectral portion of the light source is transmitted through the retarder stack and polarized with a first polarization when light from the light source passes through the at least two retarder films; and an output polarization analyzer arranged to receive light generated by the light source that has passed through the retarder stack, wherein the output polarization analyzer is adapted to pass, block or redirect light polarized with the first polarization, wherein the light source has a known optical spectrum and a region of peak optical power within the optical spectrum substantially matched to the desired spectral portion and the retarder stack is selected such that the optical power for the desired spectral portion of the light source polarized with a first polarization is maximized.

15. The illumination device of claim 14, further comprising an input polarizer arranged between the light source and the retarder stack.

16. The illumination device of claim 14, wherein the at least two retarder films comprise polymer retarders.

17. The illumination device of claim 14, wherein the at least two retarder films comprise polymer retarders.

18. The illumination device of claim 14, wherein the at least two retarder films comprise polymer films.

19. The illumination device of claim 14, wherein the at least two retarder films comprise retarder sheets.

20. The illumination device of claim 14, wherein the desired spectral portion comprises a desired color.

21. The illumination device of claim 14, wherein the desired color comprises a desired primary color.

* * * * *